United States Patent [19]

Weber et al.

[11] Patent Number: 4,843,932

[45] Date of Patent: Jul. 4, 1989

[54] DRIVE AND BEARING ARRANGEMENT FOR A CUTTING HEAD OF A CIRCULAR CUTTING MACHINE

[75] Inventors: Günther Weber, Oberer Birkenweb 17b, Biedenkopf-Wallau, Fed. Rep. of Germany, 3560; Horst Heinze, Battenberg, Fed. Rep. of Germany

[73] Assignee: Gunther Weber, Fed. Rep. of Germany

[21] Appl. No.: 184,453

[22] Filed: Apr. 21, 1988

[30] Foreign Application Priority Data

Apr. 22, 1987 [DE] Fed. Rep. of Germany ....... 3713536

[51] Int. Cl.⁴ .............................................. B26D 1/18
[52] U.S. Cl. ....................................... 83/490; 83/337; 83/355; 83/491; 83/647.5
[58] Field of Search ................. 83/491, 492, 493, 337, 83/595, 596, 490, 355, 356.3, 647.5; 384/580, 452, 453, 454, 517, 540, 563

[56] References Cited

U.S. PATENT DOCUMENTS

| | | | |
|---|---|---|---|
| 1,907,620 | 5/1933 | Berkel | 83/491 |
| 2,314,622 | 3/1943 | Klamp | 384/563 |
| 2,694,448 | 11/1954 | Petersen | 83/355 |
| 2,752,968 | 7/1956 | Toby et al. | 146/94 |
| 2,982,587 | 5/1961 | Fraser et al. | 384/454 |
| 3,353,430 | 11/1967 | Brackmann et al. | 83/490 |
| 3,530,915 | 9/1970 | Moriuchi | 83/490 |
| 3,855,889 | 12/1974 | Wiley et al. | 83/355 |
| 4,117,750 | 10/1978 | Kopelev et al. | 384/480 |
| 4,646,894 | 3/1972 | Hasten et al. | 83/355 |
| 4,685,364 | 8/1987 | Scheflow et al. | 83/355 |

FOREIGN PATENT DOCUMENTS

| | | | |
|---|---|---|---|
| 0596172 | 4/1960 | Canada | 384/453 |
| 2141561 | 1/1973 | Fed. Rep. of Germany | 384/453 |
| 2753169 | 6/1978 | Fed. Rep. of Germany | 384/452 |
| 105981 | 9/1924 | Switzerland | 384/454 |

*Primary Examiner*—Frank T. Yost
*Assistant Examiner*—Scott A. Smith
*Attorney, Agent, or Firm*—Townsend and Townsend

[57] ABSTRACT

A drive and bearing arrangement for a circular cutting machine is described which is characterized by its high operational reliability, long working life and precise knife guidance. For this purpose a particular bearing arrangement is provided for supporting the knife shaft. The knife shaft is journalled at the knife side via a bearing which is particularly suited to bear radial forces while a bearing unit which can bear both radial forces and also axial forces is provided directly adjacent this bearing. The inner and outer rings of all the bearings are clamped together without play in the axial direction.

17 Claims, 1 Drawing Sheet

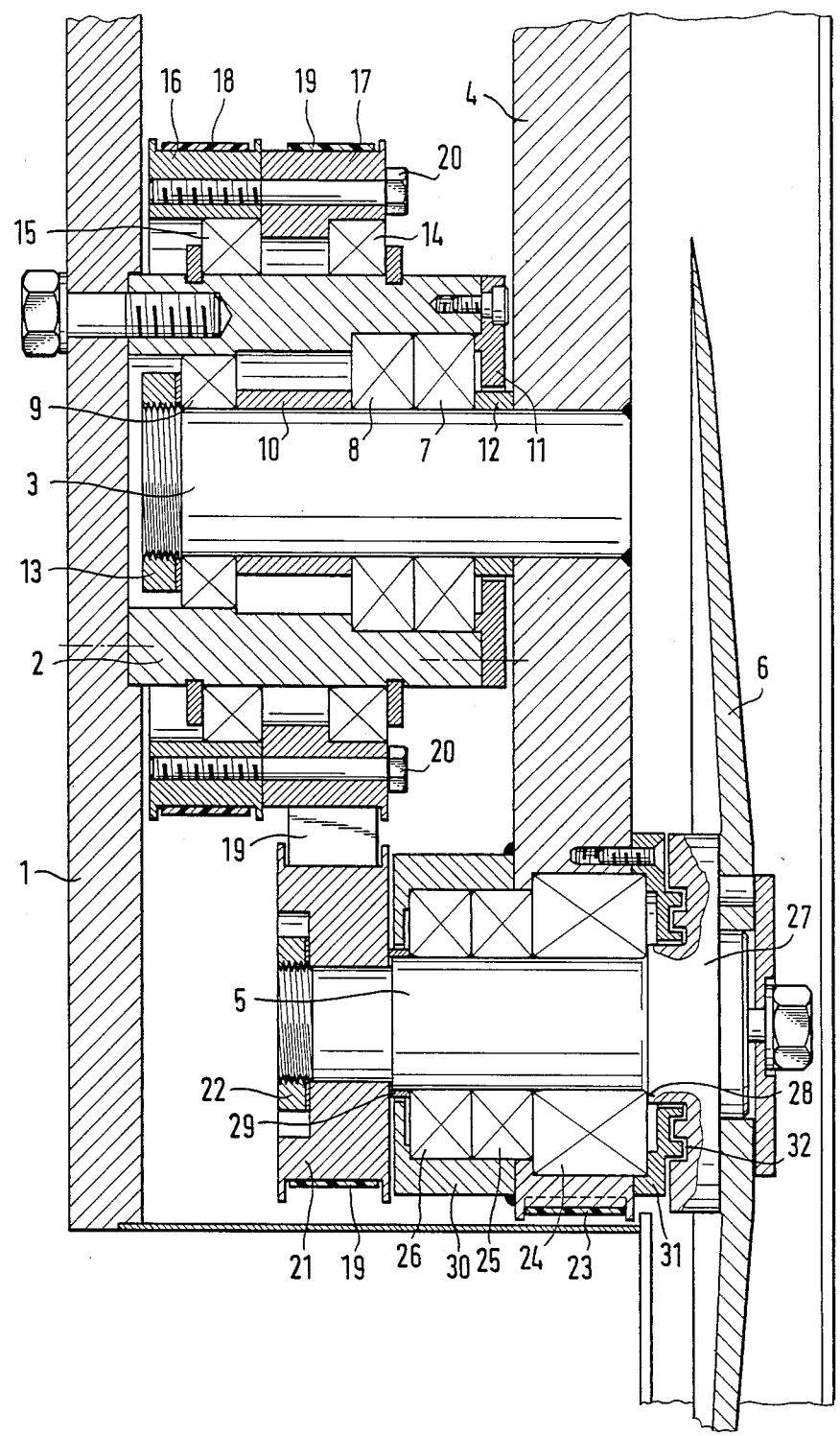

DRIVE AND BEARING ARRANGEMENT FOR A CUTTING HEAD OF A CIRCULAR CUTTING MACHINE

The invention relates to a drive and bearing arrangement for a cutting head of a circular cutting machine comprising a main shaft which is rotatably journalled relative to the machine frame and to which there is secured a carrier for a knife shaft which is eccentrically disposed relative to the main shaft and carries a disc-like cutting knife; and also members which transmit the driving force and connect the main shaft and the knife shaft together and to a drive.

Circular cutting machines, which are also called slicers serve for the cutting up of food products, in particular sausage, ham, bacon, meat, cheese and the like.

Such machines, which operate with a very rapid cutting sequence are required to provide precise cuts practically independent of the nature of the particular material to be cut up. i.e. it must also be possible to exactly cut up comparatively hard and in particular cooled materials in long term operation with precision. This presupposes that the planetory, disc-like, cutting knife which also rotates about its own axis is extremely precisely guided or journalled, and that deteriorations of the bearing brought about by wear can be precluded as far as possible because otherwise the stringent requirements on the cutting quality and on the precision of the individual cuts cannot be guaranteed. The meeting of this requirement is above all problematic because, depending on the particular material, jolts or blows of greater or lesser intensity occur during the cutting process each time the knife contacts the material to be cut. Moreover, the increases in temperature which can arise in operation in the cutting head can lead to cutting inaccuracy.

The principal object underlying the invention is thus to develop a drive and bearing arrangement of the kind initially set forth in such a way that, while retaining an economical construction, a substantial increase in the life of the cutting head is achieved while simultaneously guaranteeing precise cuts, and in such a way that it is ensured that the required accuracy of the cuts is in practice independent of the bearing temperature in the cutting head.

This object is satisfied in accordance with the invention essentially in that the knife shaft is journalled at the knife side via a first bearing which is adapted to bear radial forces; in that a bearing unit capable of bearing both radial and axial forces is provided directly adjacent the first said bearing; and in that the inner and outer rings of all bearings are clamped without play in the axial direction.

Through this type of mounting of the knife shaft one obtains, on the one hand, an ideal pick-up of high centrifugal forces and forces originating from blows arising during the cutting processes, and, on the other hand, as a result of the completely play-free axial mounting, an unusually long working life with high accuracy independent of the temperature.

A robust spindle roller bearing is preferably used for the bearing which is intended to pick-up radial forces, while the directly adjacent bearing unit preferably consists of two angular contact bearings which adjoin one another at their end faces with their inner rings coming into contact during axial clamping, and with the balls simultaneously being pressed against their corresponding shoulders so that in this way any form of axial play is precluded.

The axial clamping of the outer rings of the bearing preferably takes place by means of a clamping ring disposed at the knife side which can be connected to the carrier by screw means, with the base of a bearing pot fixedly connected to the carrier serving as the counter-abutment. The inner rings of the bearings which directly contact one another are clamped in the axial direction free of play by means of a clamping nut which is screwed onto the end of the knife shaft remote from the knife, and which in particular acts via a drive pulley and a clamping sleeve on the inner rings of the bearings which are braced at the knife side against a shoulder of a knife carrier. In this manner an extremely compact arrangement is obtained, i.e. a very short knife shaft can be used which consequently has no undesirable tendency to tilt.

The main shaft which is fixedly connected with the carrier member is journalled in a carrier sleeve fixed to the frame by means of bearings spaced apart by a distance sleeve, with at least the bearings disposed at the carrier side being likewise clamped together without play in the axial direction with respect to their inner and outer rings and preferably consisting of angular contact bearings.

Further particular advantageous embodiments of the invention are set forth in the subordinate claims.

An embodiment of the invention will now be described with reference to the drawing, the single FIGURE of which shows a partial axially sectioned representation of a cutting head with a drive and bearing arrangement constructed in accordance with the invention.

The drawing shows a part of a stable machine frame 1 in which a main shaft 3 of the cutting head is journalled via a carrier sleeve 2 which is preferably screwed to the machine frame 1. This main shaft 3 carries a carrier 4 at its end remote from the machine frame 1, with the carrier being constructed in the form of a driven disc in which a knife shaft 5 is journalled at the edge and thus eccentrically, with the knife shaft 5 carrying a disc knife 6 which is disposed parallel to the carrier 4.

The main shaft 3 is journalled in the carrier sleeve 2 via a pair of adjoining angular contact bearings 7, 8 which are disposed at the carrier side and via a dimensionally smaller angular contact bearing 9 in the region of the end of the main shaft 3 remote from the carrier 4. A distance sleeve 10 is provided between the spaced bearings 8, 9 and a further support sleeve 12 is located between the ball bearing 7 and the carrier 4. In this manner it is possible to clamp together all the inner rings of the ball bearings 7, 8, 9 without play in the axial direction by means of a clamp nut 13 which can be screwed onto the end of the main shaft 3.

The outer rings of the two adjoining angular contact bearings 7, 8 are also clamped together free of play in the axial direction, and indeed by means of a support ring 11 which is connected by means of screws to the carrier sleeve 2 and presses the outer rings against a ring shoulder of the carrier sleeve 2.

Furthermore drive rings 16, 17 are rotatably journalled on the carrier sleeve 2 via ball bearings 14, 15, with the drive rings 16, 17 being mutually fixed together by bolts 20.

The drive ring 16 is set in rotation, preferably by means of a toothed belt 18, and thus drives the adjacent drive ring 17 which is in turn coupled, preferably via a toothed belt 19, with a drive pulley 21 which is rotationally fixedly connected to the knife shaft 5.

The knife shaft 5 which can be driven via the drive pulley 21 is journalled in the carrier 4 at the knife side via a bearing 24 which is constructed to bear radial forces, and preferably consists of a spindle roller bearing, a ball bearing or a cylinder roller bearing, and also via a bearing unit which is mounted directly adjoining the bearing 24 and which preferably consists of two angular contact bearings 25, 26. Whereas the bearing 24 which serves to pick-up the radial forces is at least substantially directly received in the carrier 4, the angular contact bearings 25, 26 are located in a bearing pot 30 which is fixedly connected to the carrier 4, in particular welded thereto, so that precise bearing mounts can be provided, for example by a boring process. The spindle roller bearing 24 is dimensionally substantially larger than the individual angular contact bearings 25, 26. At the knife side the inner ring of the spindle roller bearing 25 contacts a shoulder 28 of a knife carrier 27. All the inner rings of the bearings 24, 25, 26 are clamped free of play in the axial direction, and indeed by means of the clamping nut 22 via the drive pulley 21 and a clamping sleeve 29.

In corresponding manner the outer rings of the ball bearings 24, 25, 26 are clamped against one another free of play in the axial direction, and indeed by means of a clamping ring 31 which is connected by screws to the carrier 4 at the knife side. The outer rings of the ball bearings are braced against the clamping pressure at the base of the bearing pot 30. In the radial direction the bearings are received or supported in a fitted seat.

The knife shaft 5 is of short length and the center of gravity of the rotating parts of the knife, knife shaft and other rotating parts lies in the region of the spindle roller bearing 24. It is also important that the freedom from play achieved in accordance with the invention is always present and is not first achieved at an elevated operating temperature.

In order to prevent grease from emerging from the knife shaft bearing at an elevated operating temperature a labyrinth 32 is formed between the knife carrier 17 and the clamping ring 31, and this labyrinth is closed with sealing grease.

The layout of the invention for a drive and bearing arrangement for the cutting head of a slicer is characterised by the most extreme robustness, by a high working life and by precise knife guidance which is guaranteed during the long working life, and thus by corresponding cutting accuracy and consistency of cut.

What is claimed is:

1. A cutting head assembly for a cutting head of a circular cutting machine having a machine frame, the assembly comprising:

a first bearing housing, mounted on the machine frame;

a main shaft, extending within the first bearing housing, having an end protruding beyond the first bearing housing;

first bearing means, disposed within the first bearing housing, for journaling the main shaft on the machine frame;

a knife carrier, disposed at the protruding end of the main shaft;

a second bearing housing, mounted on the knife carrier;

a knife shaft, extending through the second bearing housing, having first and second ends, said knife shaft being eccentrically disposed relative to said main shaft;

second bearing means, disposed in the second bearing housing, for rotatably supporting the knife shaft;

a disc-like cutting knife, mounted on the first end of the knife shaft on an opposite side of the knife carrier from the first bearing housing;

a first drive pulley, surrounding the first bearing housing;

third bearing means, disposed between the first drive pulley and the first bearing housing, for rotatably supporting the first drive pulley on the first bearing housing;

drive means for rotating the first drive pulley;

a second drive pulley, mounted on the second end of the knife shaft; and an endless belt, extending around the first drive pulley and the second drive pulley;

whereby rotation of the first drive pulley causes rotation of the second drive pulley and knife about the knife shaft, and produces a planetary motion of the knife carrier and knife about the main shaft.

2. A cutting head assembly for a cutting head of a circular cutting machine having a machine frame, the assembly comprising:

a first bearing housing, mounted on the machine frame;

a main shaft, extending within the first bearing housing, having an end protruding beyond the first bearing housing;

first bearing means, disposed within the first bearing housing, for journaling the main shaft on the machine frame;

a knife carrier, disposed at the protruding end of the main shaft;

a second bearing housing, mounted on the knife carrier;

a knife shaft, extending through the second bearing housing, having first and second ends, said knife shaft being eccentrically disposed relative to said main shaft;

second bearing means, disposed in the second bearing housing, for rotatably supporting the knife shaft;

a disc-like cutting knife, mounted on the first end of the knife shaft on an opposite side of the knife carrier from the first bearing housing;

a first drive pulley, surrounding the first bearing housing;

third bearing means, disposed between the first drive pulley and the first bearing housing, for rotatably supporting the first drive pulley on the first bearing housing;

drive means for rotating the first drive pulley;

a second drive pulley, mounted on the secone end of the knife shaft; and an endless belt, extending around the first drive pulley and the second drive pulley;

whereby rotation of the first drive pulley causes rotation of the second drive pulley and knife about the knife shaft, and produces a planetary motion of the knife carrier and knife about the main shaft, wherein the second bearing means includes:

a first rolling element bearing, disposed adjacent the knife, having inner and outer races, adapted to bear radial forces;

a bearing unt including at least one further rolling element bearing having inner and outer races, disposed at least in part in the second bearing housing directly adjacent the first rolling element bearing, the bearing unit adapted to bear both radial and axial forces;

first clamping means for clamping the outer races of the first rolling element bearing and of the at least one further rolling element bearing, substantially without play in an axial direction; and further clamping means for clamping the inner races of the first rolling element bearing and of the at least one further rolling element bearing, without substantially play in an axial direction of the knife shaft.

3. A cutting head assembly according to claim 2, wherein the first rolling element bearing includes a chosen one of a spindle roller bearing, a cylinder roller bearing and a ball bearing.

4. A cutting head assembly according to claim 2, wherein:
the bearing unit includes first and second adjacent ball bearings, each having a respective inner race and a respective outer race;
the first clamping means clamps the outer races of the first and second ball bearings and of said roller element bearing, substantially without play in the axial direction; and
the further clamping means clamps the inner races of the first and second bearings and of the roller element bearing, substantially without play in the axial direction.

5. A cutting head assembly according to claim 4, wherein the first and second ball bearings include angular contact ball bearings.

6. A cutting head assembly according to claim 4, wherein the first and second ball bearings include spindle bearings.

7. A cutting head assembly according to claim 2, wherein at least one further rolling element bearing in the bearing unit includes a ball bearing, and wherein the bearing unit includes a sleeve.

8. A cutting head assembly according to claim 2, wherein the first rolling element bearing has a larger outer diameter than the at least one further rolling element bearing of the bearing unit.

9. A cutting head assembly according to claim 8, wherein the first rolling element bearing projects somewhat beyond the knife carrier towards the disc-like cutting knife.

10. A cutting head assembly according to claim 9, wherein:
the second bearing housing includes a bearing pot, fixedly connected to the knife carrier at a side thereof remote from the disc-like cutting knife;
the first clamping means includes a base shoulder of the bearing pot and a clamping ring bearing on the outer race of the first rolling element bearing;
and further including means for threadably attaching the clamping ring to the knife carrier on a side of the knife carrier opposite the bearing pot.

11. A cutting head assembly according to claim 2, wherein the further clamping means includes:
a shoulder, situated on the knife shaft adjacent the disc-like cutting knife; and
a clamping nut, threadably engageable at the second end of the knife shaft;
wherein the clamping nut acts on the inner races of the first rolling element bearing and of the at least one further rolling element bearing via the second drive pulley and a sleeve.

12. A cutting head assembly according to claim 10, further including a labyrinth seal, disposed between the clamping ring and the disc-like cutting knife.

13. A cutting head assembly according to claim 2, wherein the bearing unit has an axial length which is only fractionally greater than an axial length of the first rolling element bearing.

14. A cutting head assembly according to claim 2, wherein a center of gravity of the knife shaft and parts rotating therewith about an axis thereof is disposed adjacent the first rolling element bearing.

15. A cutting head assembly according to claim 2, wherein the first bearing means includes:
a first rolling element bearing, disposed adjacent the machine frame;
second and third rolling element bearings, disposed alongside one another adjacent the knife carrier; and
a distance sleeve, disposed between the rolling element first bearing and the second and third rolling element bearings of the first housing means;
wherein inner and outer races of the second and third rolling element bearings of the first bearing means are respectively clamped together, substantially without play, in an axial direction of the main shaft.

16. A cutting head assembly according to claim 15, wherein:
the first rolling element bearing of the first housing means includes a single ball bearing, and
the second the third roller bearings of the first bearing means include angular contact bearings.

17. A cutting head assembly according to claim 2, wherein the first rolling element bearing is disposed, at least in part, in the knife carrier.

* * * * *